(12) United States Patent
Nordstoga

(10) Patent No.: US 9,679,349 B2
(45) Date of Patent: Jun. 13, 2017

(54) METHOD FOR VISUALIZING THREE-DIMENSIONAL DATA

(71) Applicant: my Virtual Reality Software AS, Oslo (NO)

(72) Inventor: Asmund Moen Nordstoga, Oslo (NO)

(73) Assignee: MY VIRTUAL REALITY SOFTWARE AS, Oslo (NO)

( * ) Notice: Subject to any disclaimer, the term of this patent is extended or adjusted under 35 U.S.C. 154(b) by 0 days.

(21) Appl. No.: 14/562,543

(22) Filed: Dec. 5, 2014

(65) Prior Publication Data

US 2015/0161760 A1   Jun. 11, 2015

(30) Foreign Application Priority Data

Dec. 6, 2013   (EP) .................................... 13196058

(51) Int. Cl.
  *G06T 1/60*    (2006.01)
  *G06T 15/04*   (2011.01)
  (Continued)

(52) U.S. Cl.
  CPC ............... *G06T 1/60* (2013.01); *G06T 15/04* (2013.01); *G06T 15/10* (2013.01); *G06T 17/05* (2013.01);
  (Continued)

(58) Field of Classification Search
  None
  See application file for complete search history.

(56) References Cited

U.S. PATENT DOCUMENTS 6,496,189 B1   12/2002   Yaron et al.
7,116,333 B1 *  10/2006   Peercy .................... G06T 15/04
                                                 345/549

(Continued)

FOREIGN PATENT DOCUMENTS

CN    101944132 A    1/2011
CN    102044089 A    5/2011
(Continued)

OTHER PUBLICATIONS

Amara et al., "A GPU Tile-Load-Map Architecture for Terrain Rendering: Theory and Applications", Published in International Journal of Graphics—The Visual Journal, vol. 25, Issue 8, Jan. 14, 2009, pp. 805-824.

(Continued)

*Primary Examiner* — Yingchun He
(74) *Attorney, Agent, or Firm* — Maschoff Brennan

(57) ABSTRACT

A method for providing a set of data files from a server computer to a mobile client device is disclosed according to at least one embodiment described herein. The method may include providing geometry data in a memory of the mobile client device, the geometry data being associated with a three-dimensional surface in an image scene; selecting data files with texture data for being provided by the server computer, wherein selecting data files is performed by a calculation unit of the mobile client device based on the geometry data and on visibility conditions of the three-dimensional surface in the image scene; and requesting the provision of the selected data files from the server computer to the client device. In some embodiments, the set of data files may include texture data being associated with a portion of the three-dimensional surface in the image scene.

18 Claims, 9 Drawing Sheets

(51) Int. Cl.
*G06T 15/10* (2011.01)
*G06T 17/05* (2011.01)

(52) U.S. Cl.
CPC ...... *G06T 2210/08* (2013.01); *G06T 2210/36* (2013.01)

(56) References Cited

U.S. PATENT DOCUMENTS

| | | | |
|---|---|---|---|
| 7,551,172 B2 | 6/2009 | Yaron et al. | |
| 8,166,042 B1* | 4/2012 | Praun | G06F 17/30327 707/743 |
| 2004/0061726 A1* | 4/2004 | Dunn | G06T 17/05 715/855 |
| 2005/0268038 A1* | 12/2005 | Yasue | G06F 12/0802 711/118 |
| 2009/0195541 A1* | 8/2009 | Peng | G06T 15/005 345/420 |
| 2010/0182323 A1* | 7/2010 | Nuydens | G06T 17/20 345/441 |
| 2013/0321593 A1* | 12/2013 | Kirk | G06T 15/04 348/51 |

FOREIGN PATENT DOCUMENTS

| | | |
|---|---|---|
| CN | 103093499 A | 5/2013 |
| CN | 103150750 A | 6/2013 |
| EP | 2 555 166 A1 | 2/2013 |

OTHER PUBLICATIONS

Zhang et al., "Visualization of Large Spatial Data in Networking Environments", Computers & Geosciences, vol. 33, Issue 9, Jul. 18, 2007, pp. 1130-1139.

Sun et al., "3D Visualization of Large Digital Elevation Model (DEM) Data Set", Computational Science—ICCS 2002, vol. 2331, Apr. 10, 2002, pp. 975-983.

European Search Report dated Apr. 11, 2014 as received in Application No. EP 13 19 6058.

* cited by examiner

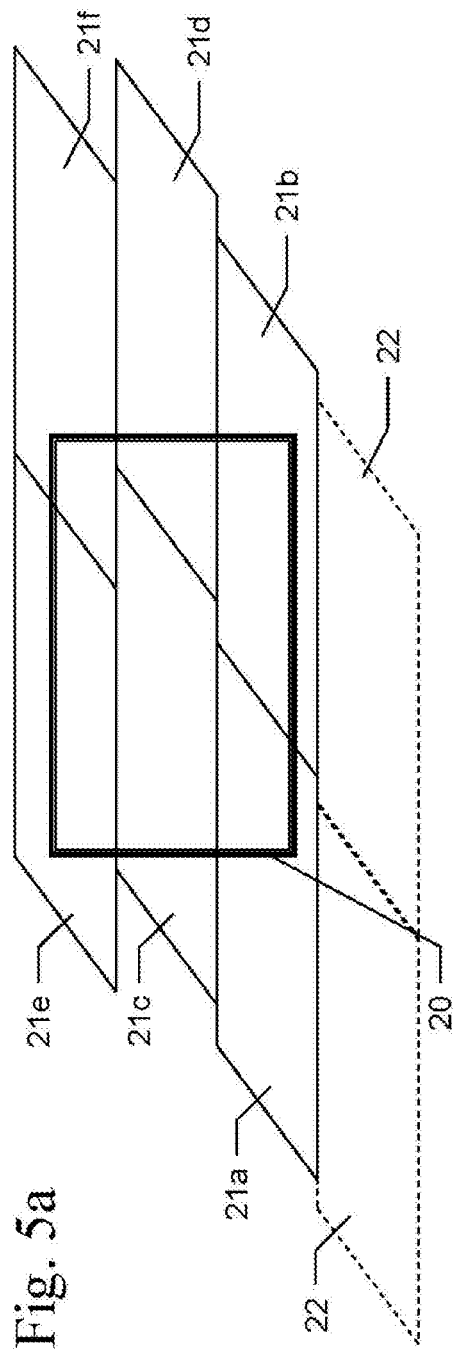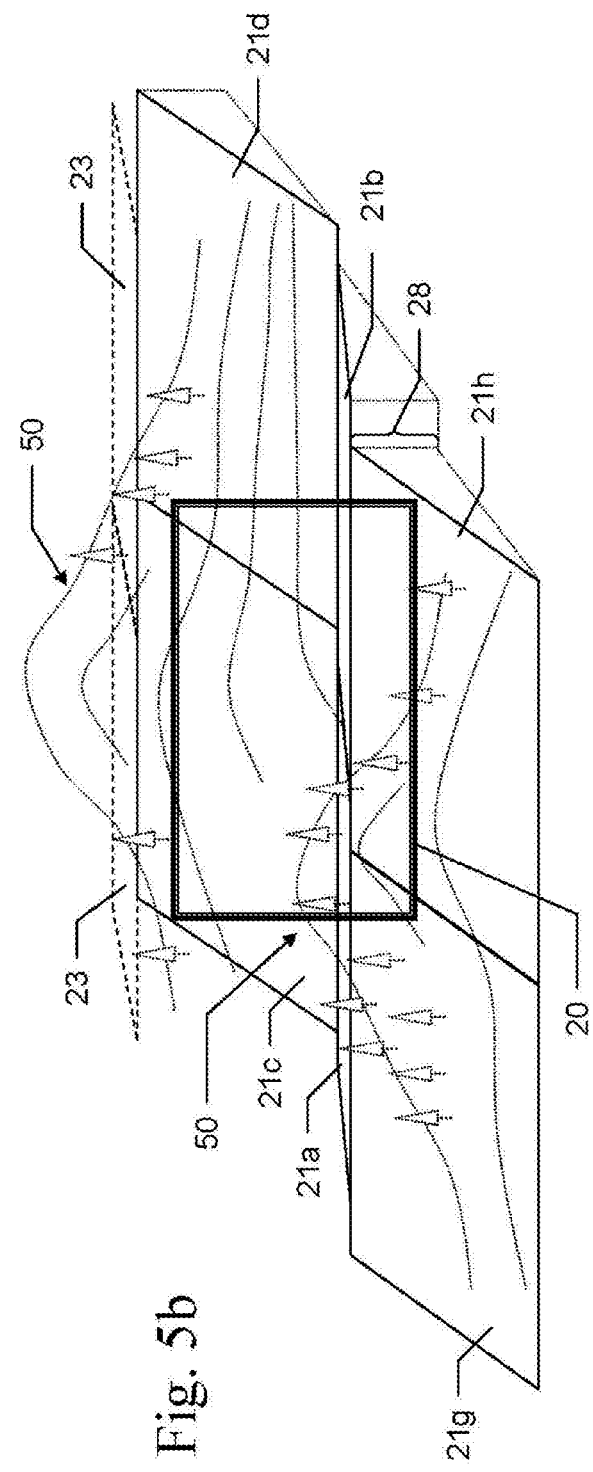

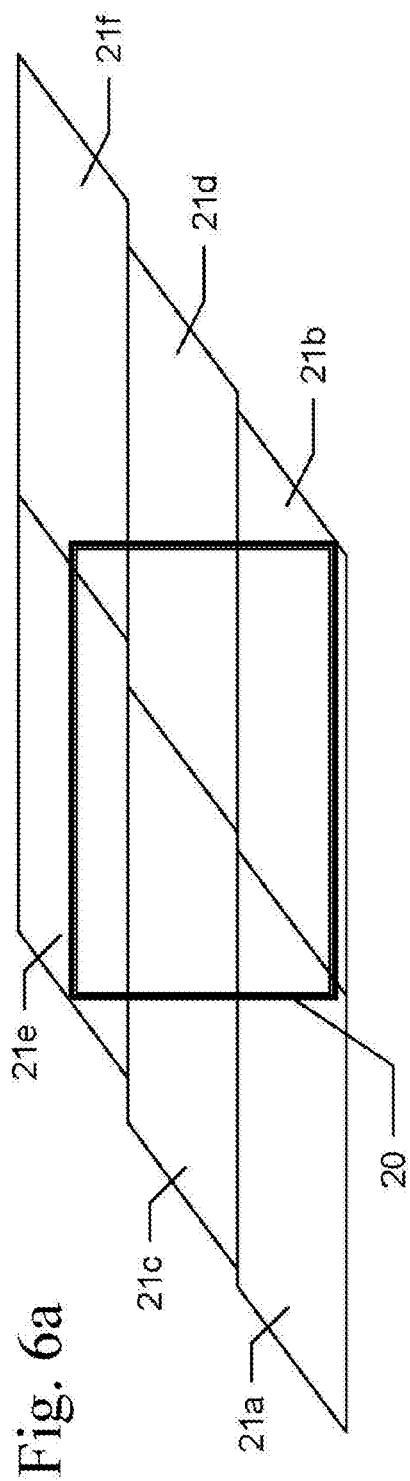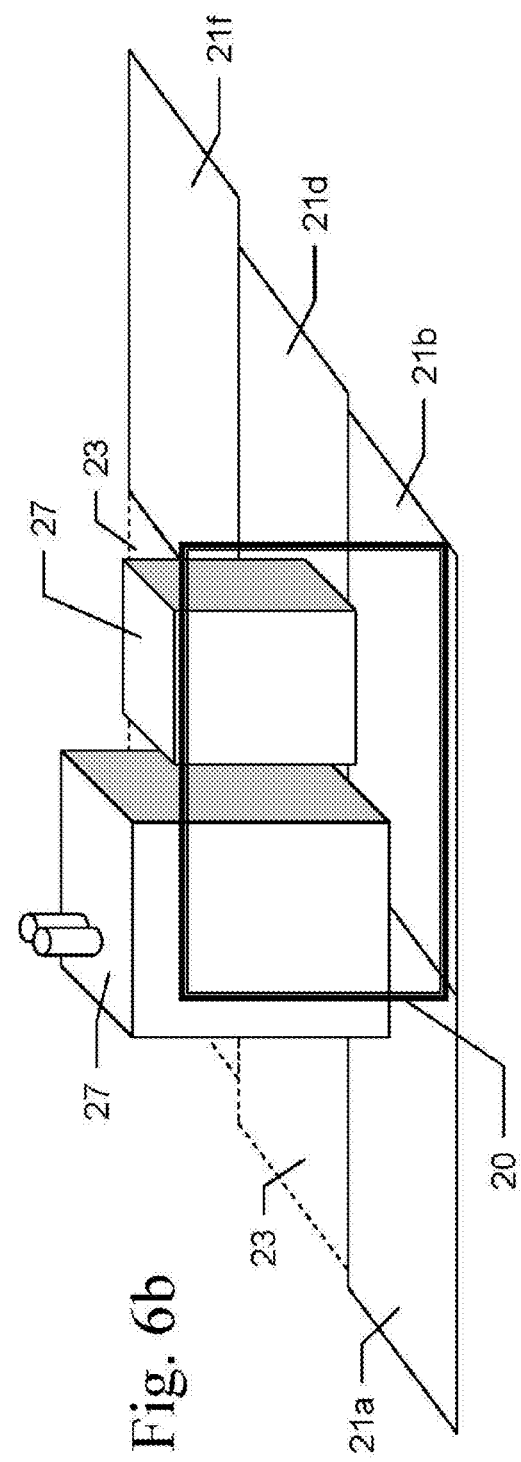

METHOD FOR VISUALIZING THREE-DIMENSIONAL DATA

FIELD OF THE INVENTION

The present invention pertains to a method for rendering data of a three-dimensional surface, particularly a terrain, having a multitude of detail levels. It is an improved method for quickly selecting only the necessary collection of data blocks from a multitude of data blocks for describing the three-dimensional data from the present viewing position. This is achieved by providing the geometry data before the texture data and then basing the selection of texture data blocks at least partially on the geometry data.

BACKGROUND

Rendering is the process of generating an image from a model such as a three-dimensional terrain model by means of a computer programme. The three-dimensional terrain model to be rendered can be a grid comprising elevation data, such as a Digital Elevation Model (DEM), a Digital Surface Model (DSM) or a Digital Terrain Model (DTM). The digital model may comprise data of a limited area, such as a model of a particular city or landscape, as well as a model of a continent or even the complete Earth.

Computer rendering of three-dimensional terrain images is generally known from prior art: U.S. Pat. No. 7,551,172 B2 discloses a method for sending information representing three-dimensional images over a network, and U.S. Pat. No. 6,496,189 B1 discloses a method and apparatus for displaying images of an area as seen from an interactively chosen observation point on a remote device.

When rendering large three-dimensional data, particularly in a mobile device, the transfer speed of the data can become limiting factors. Recently, in new portable mobile electronic devices, such as Smartphones or tablet computers, the memory for storing data and the computing capacities have largely increased. However, normally the memory of the devices is still too small for storing all of the needed data for rendering a three-dimensional map in the memory at the same time. Therefore, it is important to partition the data in such a way that not all of the data needs to be stored in the memory of the device. If the network for the provision of the data is slow, for instance in the case of a slow wireless internet connection, it may take too long to transfer all of the data over the network for an efficient use of the data, e. g. for navigation purposes.

A common solution is to subdivide the data into smaller data blocks, wherein each of the data blocks describes a section of the data. Additionally, it is a common solution to create data blocks with several representation versions of each section, the representation versions having different detail levels. This allows describing a collection of data blocks having detail levels that can be used to render the data with sufficient quality, while still only a fraction of the original size of the complete data set has to be load or transferred.

In a common method for rendering three-dimensional terrain data, a tree structure is used, which divides the data into tiles and different levels of detail, wherein each level of detail comprises more information than the previous one, thus allowing zooming in or out while keeping the rendering quality and preserving the amount of memory needed on the device.

The usual way in known methods is to load all data sections from the lowest to the highest detail level while traversing down a tree structure, thus loading the higher detail levels only after the lower detail levels already have been loaded and displayed. With this known solution always some data—even if of a low detail level—is displayable, thus avoiding "holes" in the representation. However, it may instead be preferred that the amount of transferred data is as small as possible, especially when the data is transferred over a slow network connection.

SUMMARY

Some embodiments may provide an enhanced method for loading surface data representing a portion of a three-dimensional surface into a memory.

Some embodiments may provide a method that allows reducing data traffic in a network.

Some embodiments may provide a method that avoids or reduces the amount of data that is downloaded from an external server.

Some embodiments may provide a method that allows using geometry data from different sources.

Some embodiments may provide a method for downloading and displaying the selected surface data.

Some embodiments may provide a method being executable on a hand-held mobile device, and to provide a hand-held device for execution of methods disclosed herein.

Some embodiments may provide a computer programme product for execution of said method, in particular on a hand-held device.

Some embodiments may be achieved by an automatic preselection process based on the geometry data before downloading the surface data.

A method for providing a set of data files from a server computer to a mobile client device, the set of data files comprising texture data being associated with a portion of a three-dimensional surface in an image scene, wherein the image scene is defined by an observation point and a direction and/or angle of view, the set of data files is a subset of data files being stored on the server computer, and each data file comprises texture data in one of a plurality of different detail levels, according to the invention comprises
  providing geometry data in a memory of the mobile client device, the geometry data being associated with the three-dimensional surface in the image scene;
  selecting data files with texture data for being provided by the server, wherein selecting data files is performed by a calculation unit of the client device based on the geometry data and on visibility conditions of the three-dimensional surface (25) in the image scene (20); and
  requesting the provision of the selected data files from the server computer to the client device.

In one embodiment of the method, selecting data files comprises selecting, based on the geometry data, data files to be requested, the texture data of which is visible in a present image scene and particularly has a required detail level, in particular wherein data files, the texture data of which is not visible in a present image scene due to geometry data, are not requested.

In a particular embodiment of the method, the geometry data comprises elevation data of the three-dimensional surface.

In another embodiment, the geometry data comprises displayable features, particularly models of individual buildings or trees.

In one embodiment of the method according to the invention, the visibility conditions comprise a visibility of a portion of the three-dimensional surface in the image scene, and a detail level of the texture data associated with a portion of the three-dimensional surface in the image scene, wherein the detail level meets the criteria of a predefined resolution quality factor, being calculated based on a distance from the surface to an observation point. In particular, calculating the quality factor is also based at least on one of the following:

- a screen coverage factor related to how much a texture would cover a computer display surface when displayed;
- a scene coverage factor related to how much of a texture covers a surface located in a scene outside a computer display edge; and/or
- an actual area a minimum enclosing volume would cover of the rendering surface.

A particular embodiment of the method according to the invention comprises rendering provided texture data based on the geometry data associated with the portion of the three-dimensional surface and displaying the rendered data on a display of the mobile device.

In one embodiment, this method comprises rendering default surface texture, particularly until the texture data is provided and displayable, wherein the default surface texture is based on the geometry data. In particular, the default surface texture comprises isohypses and/or colouring according to an elevation value provided by the geometry data. The default surface texture can also be computed in a GPU (graphics processing unit) shader based on the geometry before being displayed.

In a further embodiment of the method according to the invention, the geometry data is provided to the memory from a data storage system of the client device and/or of the server, the memory particularly being a cache. In particular, the geometry data is stored in the memory according to the least recently used cache algorithm, and/or in indexed portions, independent of the structure of the rendered data.

In another embodiment of the method according to the invention, providing geometry data comprises merging geometry data from different sources, particularly merging provided geometry data with user-defined geometry data, wherein selecting data files is based on the merged geometry data.

In one embodiment, the geometry data comprises elevation data of the three-dimensional surface, and the method comprises dynamically computing at least one set of altered elevation data from the provided elevation data, each set of altered elevation data having a different detail level, particularly wherein the different detail levels of the altered elevation data are based on the detail levels of the texture data, particularly wherein selecting data files with texture data for requesting from the server is based on a set of altered elevation data.

The invention also pertains to a mobile client device adapted for performing the method according to the invention.

A mobile client device adapted for requesting a set of data files from a server computer, the mobile client device comprising a display, a data storage system and a calculation unit, and the set of data files comprising texture data being associated with a portion of a three-dimensional surface in an image scene, wherein the image scene is defined by an observation point and a direction and/or angle of view, the set of data files is a subset of data files being stored on the server computer, and each data file comprises texture data in one of a plurality of different detail levels, and the display is adapted for displaying the image scene, according to the invention is characterized in that the data storage system is adapted for storing geometry data, the geometry data being associated with the portion of the three-dimensional surface in the image scene, the calculation unit is adapted for selecting, based on the geometry data and on visibility conditions of the texture, data files with texture data for being provided by the server computer, and the computing unit is adapted for requesting the provision of the selected data files from the server computer.

In one embodiment of the mobile client device, the data storage system comprises a cache memory adapted to store the geometry data, particularly according to the least recently used cache algorithm.

In one embodiment, the geometry data is provided to the data storage system by the server.

In another embodiment of the mobile client device, the calculation unit comprises a graphics processing unit. Particularly, selecting data files and/or computing default surface texture comprising isohypses, colouring and/or shading according to an elevation value provided by the geometry data is performed by the graphics processing unit.

In a further embodiment of the mobile client device, the calculation unit is adapted for computing and rendering default surface texture, particularly until the texture data is provided and displayable, wherein the default surface texture is based on the geometry data, in particular wherein the default surface texture comprises isohypses, colouring and/or shading according to an elevation value provided by the geometry data.

In a particular embodiment, the calculation unit is adapted for merging geometry data from different sources, particularly merging provided geometry data with user-defined geometry data, and the calculation unit is also adapted for selecting data files with texture data for being provided by the server based on merged geometry data.

In one embodiment of the mobile client device according to the invention, the geometry data comprises elevation data of the three-dimensional surface, and the calculation unit is adapted for dynamically computing at least one set of altered elevation data from the provided elevation data, each set of altered elevation data having a different detail level, particularly wherein the different detail levels of the altered elevation data are based on the detail levels of the texture data. Particularly, the calculation unit is adapted for selecting data files with texture data for requesting from the server based on a set of altered elevation data.

The invention also pertains to a computer programme product for performing the method according to the invention.

A computer programme product, comprising programme code which is stored on a machine-readable medium, or being embodied by an electromagnetic wave comprising a programme code segment, and having computer-executable instructions for performing, in particular when run on a calculation unit of a mobile client device according to the invention, the following steps of the method according to the invention:

selecting, based on the geometry data and on visibility conditions of the three-dimensional surface in the image scene, data files with texture data for being provided by the server, and requesting the provision of the selected data files from the server computer to the client device.

BRIEF DESCRIPTION OF THE DRAWINGS

The invention in the following will be described in detail by referring to exemplary embodiments that are accompanied by figures, in which:

FIG. 5a-b illustrate the selection of texture data on a surface without and with elevation data;

FIG. 6a-b illustrate the selection of texture data on a surface without and with feature data;

DETAILED DESCRIPTION

Figure 1:
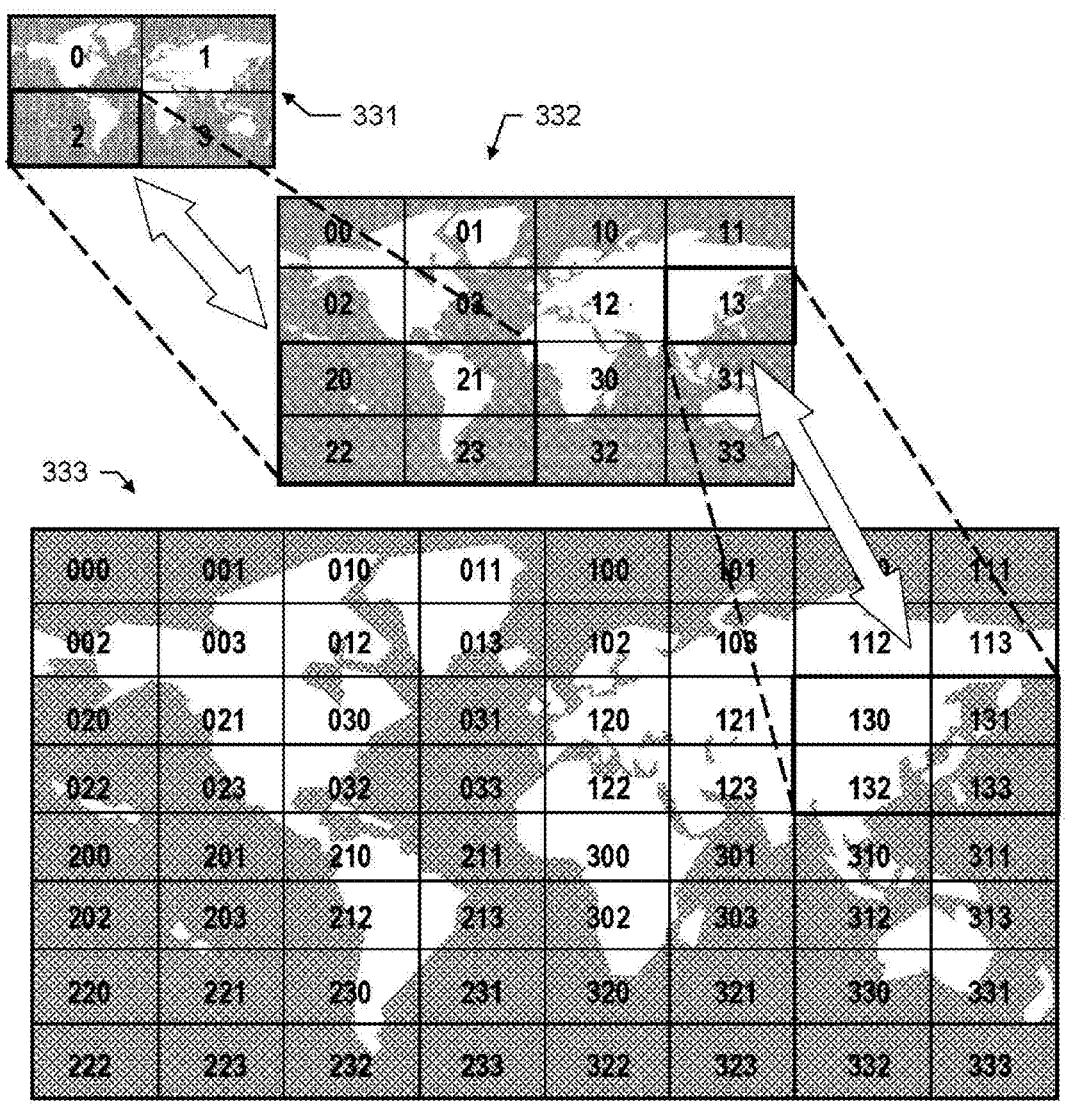
FIG. 1 shows the distribution of tiles in different detail levels of a representation of a terrain.

FIG. 1 shows an example for a representation of a terrain in three different detail levels 331-333. The representation is subdivided into a multitude of tiles, each of which particularly comprising a bitmap of a part of the representation. Each tile is assigned a number from which its position and detail level can be derived. In particular, each tile is comprised by a certain data file. The first detail level comprises the lowest amount of details.

In this example, in the first detail level 331 the terrain is subdivided into the four rectangular tiles with the numbers "0", "1", "2" and "3", each corresponding to four tiles of the second detail level 332 which is, thus, subdivided into sixteen tiles. Tile "2" of the first detail level e. g. corresponds to tiles "20", "21", "22" and "23" of the second detail level. Each of the second detail level tiles corresponds to four tiles of the next higher level, the third detail level 333, so that this level is subdivided into sixty-four tiles. Tile "13" of the second detail level e. g. corresponds to tiles "130", "131", "132" and "133" of the second detail level.

Figure 2:
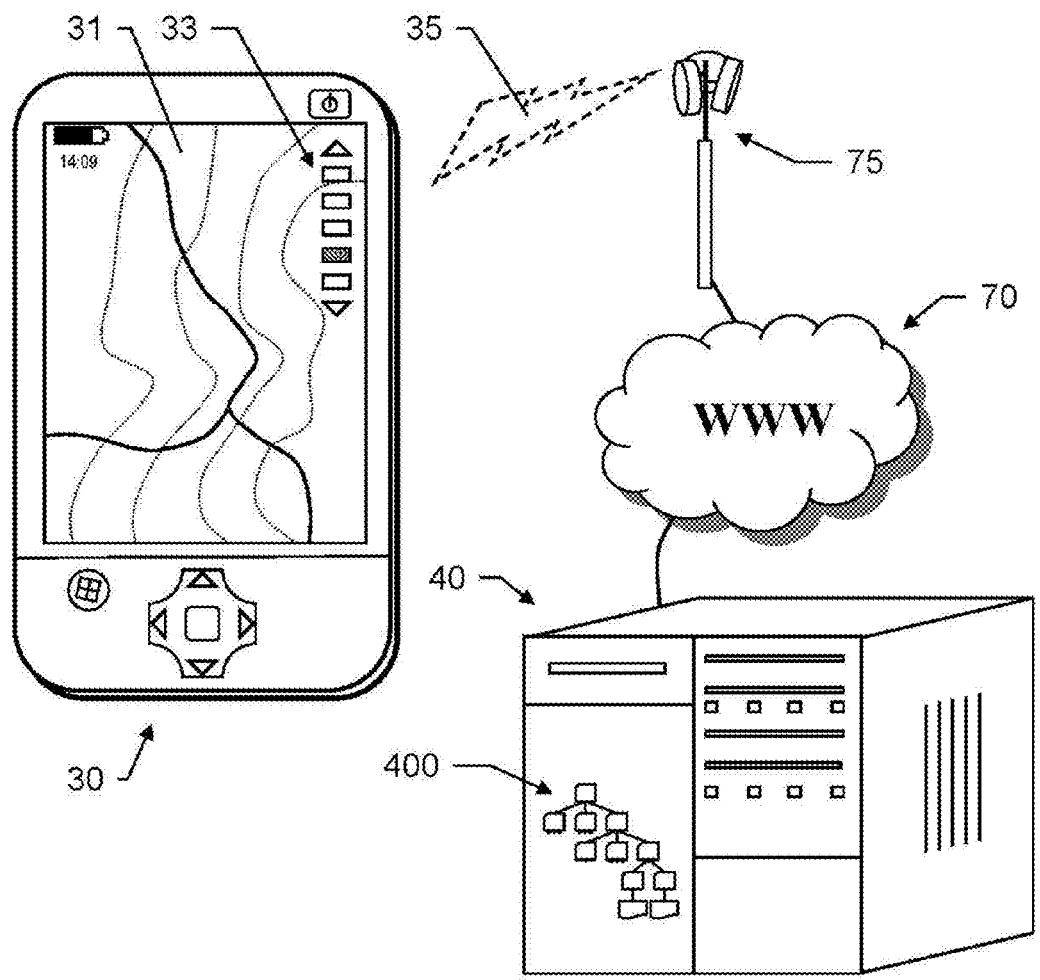
FIG. 2 shows an exemplary embodiment of a hand-held mobile device according to the invention, being connected with a server computer.

In FIG. 2 an exemplary embodiment of a server-client-system for execution of the method according to the invention is depicted. The depicted system comprises an exemplary embodiment of a mobile device 30 according to the invention. The device is hand-held and comprises a rendering unit (not shown) for rendering data representing physical features of a portion of a three-dimensional surface, particularly by a method according to the invention, as described further below. The mobile device furthermore comprises a display 31, particularly designed as a touchscreen, the display 31 being adapted for displaying an image based on the data rendered by the rendering unit, particularly a representation of a three-dimensional terrain. The display 31 comprises a zoom functionality 33 for zooming in and out, i.e. changing the detail level of the displayed data. The device furthermore comprises locating means, such as a GNSS receiver, and communicating means for wirelessly receiving the data from a remote server 40.

The depicted mobile device 30 has communication means for establishing a connection with the server 40 via the internet 70 by means of a wireless connection 35 to a cell phone base station 75. On the remote server 40, data files are stored as nodes of a hierarchical file system 400, the data files comprising information about the three-dimensional terrain.

A request unit of the mobile device 30 sends a request to the remote server 40 to provide a certain data file for downloading, the data file e. g. comprising a bitmap of a part of the terrain in a certain resolution level. The remote server 40 then sends the requested file to the mobile device 30, so that the information is displayable on the display 31.

Figure 3:
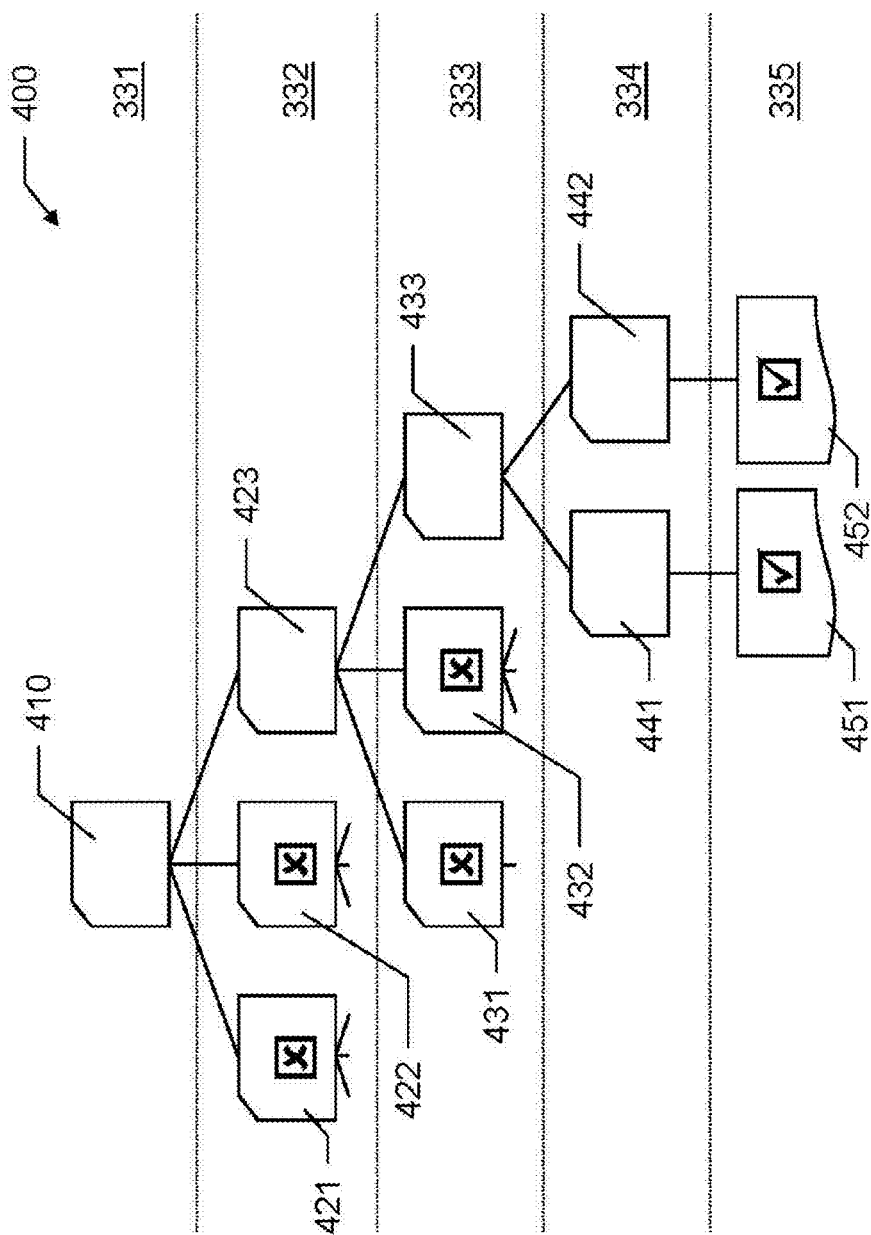
FIG. 3 illustrates a hierarchical file system, wherein data files at a plurality of different detail levels are stored as nodes of the file system.

FIG. 3 shows an exemplary hierarchical file system 400, wherein data files at a plurality of different detail levels 331-335 are stored as nodes of the file system 400. In general, a node of such a hierarchical file system 400 can have as few as one or two child nodes, or as many as several dozens.

In the first detail level 331 (comprising the fewest details) there is the top node 410. The top node 410 has three child nodes 421-423 in the second detail level 332, each of which having child nodes in the third detail level 333. For the sake of clarity, this is shown here for one of the nodes only: node 423 has three child nodes 431-433, each of which having child nodes in the fourth detail level 334. Again, this is shown for one of the nodes only: node 433 has two child nodes 431,432, each of which having a child node 451,452 in the fifth detail level 335 (comprising the most details).

An exemplary embodiment of the method according to the invention employs this hierarchical file system 400 to select those data files that are necessary for displaying a certain portion of the three-dimensional surface. For each node the method comprises the step of confirming whether data from the respective node is needed for display, and—if it is needed—of determining whether the detail level of the respective node is sufficient in order to display the portion in accordance with a certain quality factor. Thereby, if the detail level is sufficient, the data of the respective node is downloaded. If the detail level is not sufficient, the method is repeated for a child node of the respective node.

Figure 4A:
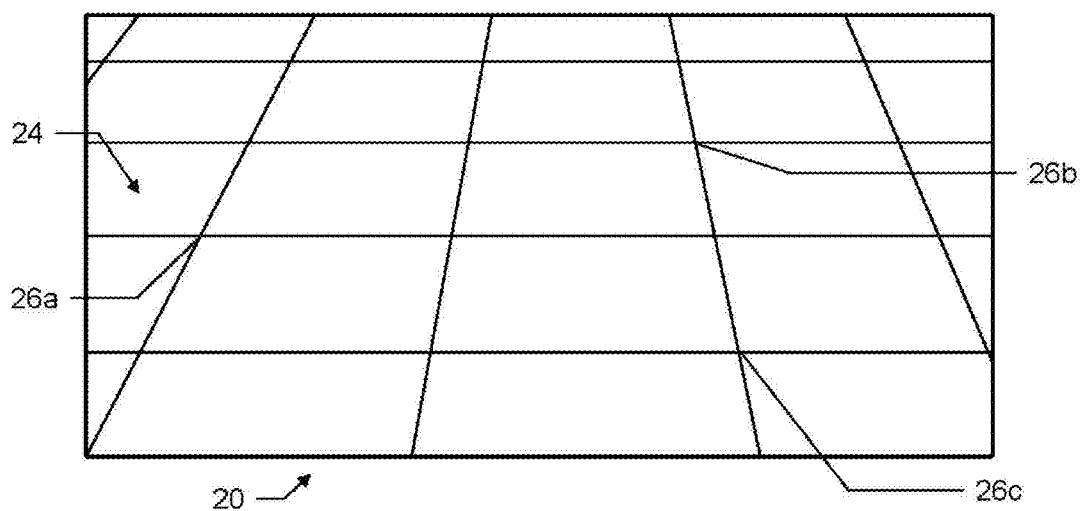
FIG. 4a is an image scene showing a portion of a surface without elevation data.
Figure 4B:
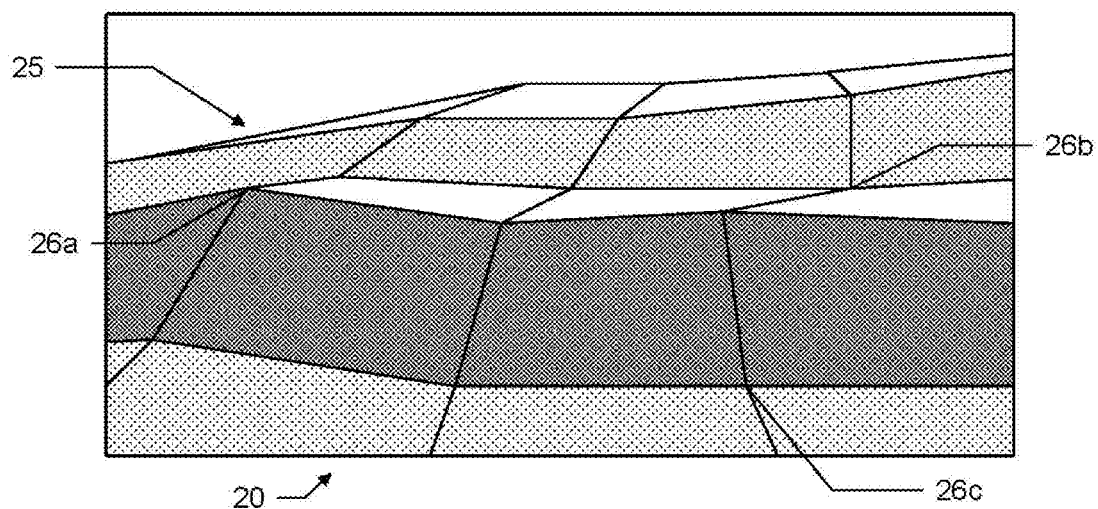
FIG. 4b is an image scene showing the portion of the surface of FIG. 4a with elevation data.

In FIGS. 4a and 4b an image scene 20 is depicted. Each image scene 20 shows the same portion of a surface, e. g. a part of a terrain, from an interactively chosen observation point to a user. In FIG. 4a the surface 24, which is represented by a grid of coordinates 26a-c, comprises no geometry data and is, thus, two-dimensional. Each coordinate 26a-c has an elevation of zero. In FIG. 4b, geometry data has been added to the surface 25, which is, thus, three-dimensional. Every coordinate 26a-c is assigned an individual elevation value. Due to the elevation of coordinate 26a, a part of the surface which has been visible in FIG. 4a is no longer perceivable in the image scene 20 of FIG. 4b. In order to reduce data traffic when downloading texture data to display this image scene 20, data representing this part of the three-dimensional surface 25 therefore could be omitted if the data's expendability would be known beforehand.

FIGS. 5a and 5b illustrate the selection of texture data on a surface without and with elevation data 28.

FIG. 5a shows a portion of a surface which is composed of a number of texture data tiles 21a-f,22. The surface does not comprise any geometry data. In an image scene 20 that is visualized to a user the tiles 21a-f are visible. The other tiles 22 are not visible in this image scene 20. In a known method, the tiles 21a-f, comprising texture and geometry data, would be requested or downloaded from a server, in order to display them to the user.

In FIG. 5b the same portion of the surface is shown. In contrast to FIG. 5a, geometry data is provided in form of elevation data 28 that represents a hilly terrain 50 (for means of clarity the geometry is simplified here). In the same, unaltered, image scene 20, due to this elevation data 28, some tiles 23 that formerly have been visible (tiles 21e and 21f in FIG. 5a) are now outside the image scene 20, and some tiles 21g-h that formerly were outside the image scene 20 (tiles 22 in FIG. 5a) are now visible.

This means that, in order to display all the visible texture in the image scene 20, with provided elevation data 28 other data files need to be provided than without. If the elevation data 28 is provided before the texture data, unnecessary data traffic can therefore be reduced.

FIGS. 6a and 6b illustrate the displaying of texture data on a surface without and with feature data 27.

FIG. 6a shows a portion of a surface which is composed of a number of texture data tiles. The surface does not comprise any geometry data. In an image scene 20 the tiles 21a-f are visible.

In FIG. 6b the same portion of the surface is shown. In contrast to FIG. 6a, geometry data is provided in form of feature data 27 which represents buildings. Due to this feature data 27 in the unaltered image scene 20, some tiles 23 that formerly were visible (tiles 21c and 21e in FIG. 6a) are now outside the image scene 20. This means that, in order to display all the visible texture in the image scene 20, with provided feature data 28 other data files (in this example less data files) need to be provided than without. If the feature data 28 is provided before the texture data, unnecessary data traffic can therefore be reduced.

Figure 7A:
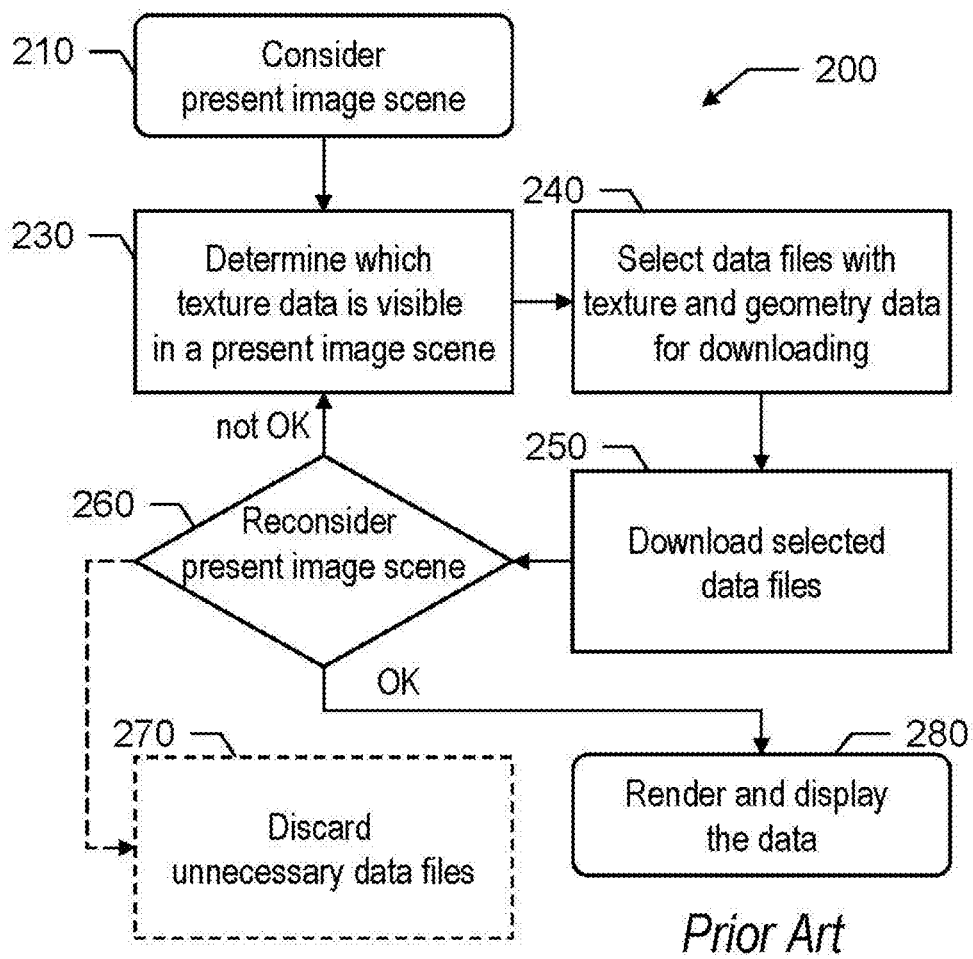
FIG. 7a is a flow chart illustrating a known method for selecting data files for downloading.
Figure 7B:
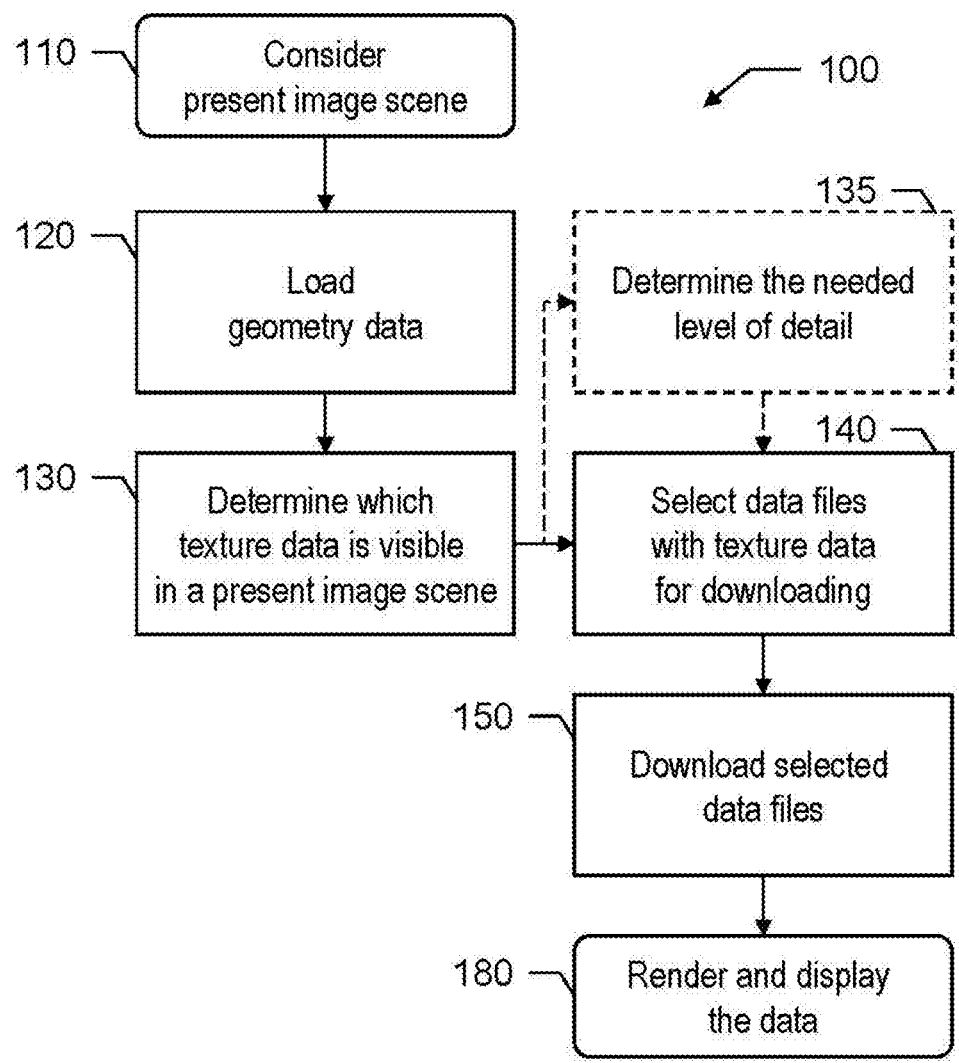
FIG. 7b is a flow chart illustrating an embodiment of a method according to the invention for selecting data files for downloading.

FIGS. 7a and 7b are flow charts illustrating methods to be performed on a mobile device.

FIG. 7a is a flow chart illustrating a known method 200 for selecting data files for downloading. The method starts with considering 210 the present image scene and determining 230 which texture data is visible in this scene. When the visible texture data is determined, data files comprising this texture data in the guesstimated detail level and the corresponding geometry data can be selected 240 for downloading 250 the selected data files from a server. When the data files are downloaded and ready for rendering and displaying the present image scene is reconsidered 260 with respect to the visibility of the texture data. This is necessary, as the geometry data was not available before downloading the data files, and the geometry often changes the visibility of parts of the texture in the image scene (as laid out in FIGS. 4a-b, 5a-b and 6a-b). Reconsidering 260 then occasionally leads to discarding 270 unnecessarily downloaded data files, when the texture data is not visible due to the geometry. If the reconsidering 260 shows that not all necessary texture data has been downloaded, the method continues with determining 230 which (not already downloaded) texture data is visible in the image scene. If the reconsidering 260 shows that all necessary texture data has been downloaded, the data can be rendered and displayed 280 to the user. Alternatively, the step of displaying 280 may also be performed before the step of reconsidering 260 the image scene. This, disadvantageously, leads to holes in the texture, though.

FIG. 7b is a flow chart illustrating an exemplary embodiment of a method 100 according to the invention for selecting data files for requesting from a server.

The method starts with considering 210 the present image scene. Then, according to the invention, geometry data, for instance DEM or DTM elevation data, for the present image scene is loaded 120, e. g. into a cache of the device. Particularly, the geometry data is stored in a data storage system of the device and provided to the cache. Alternatively, it can be downloaded from the server, where it is provided separately from the texture data.

Particularly, the geometry data is stored in indexed sections, independent of the structure of the rendered data, in a cache of the device, for instance cached according to the least recently used strategy (LRU cache). It may also involve duplication of elevation data at the borders of the different sections. This way of storing the geometry data for instance allows faster elevation queries, such as placing features (e. g. icons or vector data) that do not have height information assigned.

Then, based on the loaded geometry data, texture data which is visible in the present image scene and needs to be displayed is determined 130. In particular, texture which is hidden behind displayable features of the geometry data, such as buildings, or behind elevations in a hilly terrain will not be displayed and therefore do not need to be loaded. For instance, elevation data can be used for an improved estimation of texture tile bounding boxes for checking the tiles' visibility.

Optionally, in a step 135 also the needed detail level of the texture data is determined. This can be computed depending on the elevation of the respective texture data relative to the virtual camera position of the image scene. Textures which are nearer to the camera position usually are preferred to be displayed with higher detail levels. The elevation is known from the geometry data. This step prevents the expendable transferring of data files with texture data not having a suitable detail level, and thus helps further reducing data traffic.

Based on the determining step(s) 130,135, data files comprising the needed texture data in the correct detail level are selected 140 for downloading and then downloaded 150 from the server (obviously, alternatively the files can also be uploaded by the server to the device upon request from the device). As the correct data files are then provided on the device, no further reconsidering steps are necessary and the data can be rendered and displayed 180 to the user. As there are no data files transferred unnecessarily, with this method the data traffic can be largely reduced.

The rendering preferably also comprises a dynamical computing of geometry for rendering texture data on the surface in different detail levels. This means that vertex coordinates, texture coordinates and index buffer are computed from elevation data, depending on the incoming 2D texture tiles and their coordinate reference system and bounding boxes. This enables a dynamic "re-projection" of the map data, for instance when zooming in the same area, and supports a rendering of texture data having different source coordinate reference systems directly in the same image scene, i.e. if the coordinate system of a texture tile is different from that of the geometry data this process involves "re-projecting" the respective tile bounding box. In order to reduce data traffic, these computations are preferably performed by a calculation unit of the mobile device, e. g. a graphics processing unit (GPU). Thus, geometry in only one detail level needs to be transferred.

Depending on the size and resolution of the geometry data on the server, there may also be LOD-ing of the height maps: when zooming through the texture detail levels (e. g. levels 0-18), optionally some height map geometry levels (e. g. levels 8 and 12) can be loaded on the way.

Especially if the data connection is slow and the displaying of the downloaded texture data is thus delayed, in order to avoid holes in the image scenes, default surface texture can be rendered on the geometry data and be displayed. Particularly, the default surface texture can comprise information provided by the geometry data, such as isohypses for creating a contour map or colouring according to an elevation value provided by the geometry data. The colouring may comprise shadowing effects or an RGB colour coding for creating a height map.

Figure 8:
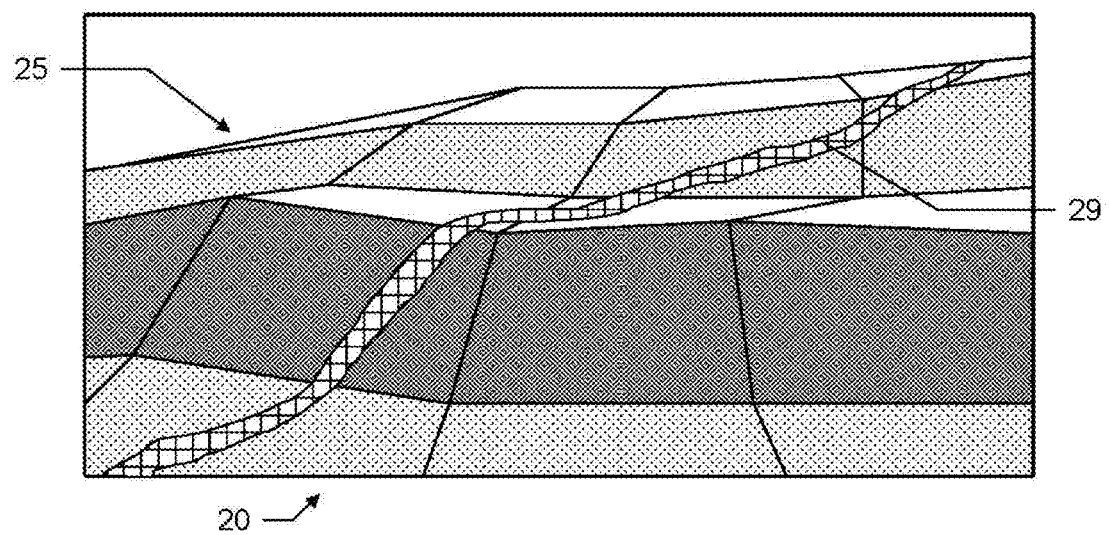
FIG. 8 is an image scene showing the portion of the surface with elevation data of FIG. 4b with additional elevation data.

With the present invention it is also possible to combine geometry data from different sources and use the combined geometry data for selecting the data files for downloading. In particular, existing global geometry data which is stored on the mobile device can be supplemented by useradded content. This is shown in FIG. 8 which is an image scene 20 showing the portion of the surface 25 with elevation data of FIG. 4*b* and additional elevation data 29. As shown here, high accuracy, dense elevation data of a certain area, e. g. for excavation work to be done in a road construction project can be merged with the prestored elevation data. The merged data then, preferably, can be used for determining, which data files need to be transferred in order to display (only) the necessary texture data. After texture is applied, the merged data will appear to the end user as coming from a single geometry source.

The source texture tiles can have different coordinate reference systems and be displayed in a different target coordinate reference system. The target coordinate reference system can be changed "on the fly".

The density of the vertices of the geometry that is computed depends on the type of source coordinate reference system and how much it differs from the target coordinate reference system, and of the required accuracy of display.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for providing a set of data files from a server computer to a mobile client device, the set of data files comprising texture data being associated with a portion of a three-dimensional surface in an image scene, the three-dimensional surface representing a terrain, wherein
the image scene is defined by an observation point and a direction and/or angle of view,
the set of data files is a subset of data files being stored on the server computer,
each data file comprises texture data in one of a plurality of different detail levels, and
geometry data is stored in a data storage hardware of the mobile client device, the geometry data comprising elevation data of the three-dimensional surface,
wherein the method comprises:
providing geometry data that is associated with the three-dimensional surface in the image scene from the data storage hardware to a cache memory of the mobile client device;
selecting data files with texture data for being provided by the server computer, wherein selecting data files is performed by a processor of the client device based on the geometry data and on visibility conditions of the three-dimensional surface in the image scene; and
requesting the provision of the selected data files from the server computer to the client device.

2. The method according to claim 1, wherein selecting data files comprises selecting, based on the geometry data, data files to be requested, the texture data of which is visible in a present image scene and has a required detail level, wherein data files, the texture data of which is not visible in a present image scene due to a geometry of the three-dimensional surface, are not requested.

3. The method according to claim 1, wherein the geometry data comprises:
displayable models of individual buildings or trees.

4. The method according to claim 1, wherein the visibility conditions comprise:
a visibility of a portion of the three-dimensional surface in the image scene; and
a detail level of the texture data associated with the portion of the three-dimensional surface in the image scene, wherein the detail level meets criteria of a predefined resolution quality factor, being calculated based on a distance from the surface to an observation point,
wherein calculating the quality factor is also based at least on at least one of the following:
a screen coverage factor related to how much a texture would cover a computer display surface when displayed;
a scene coverage factor related to how much of a texture covers a surface located in a scene outside a computer display edge; and
an actual area a minimum enclosing volume would cover of a rendering surface.

5. The method according to claim 1, further comprising rendering provided texture data based on the geometry data associated with the portion of the three-dimensional surface and displaying the rendered data on a display of the mobile device.

6. The method according to claim 5, further comprising rendering default surface texture until the texture data is provided and displayable, wherein the default surface texture is based on the geometry data.

7. The method according to claim 6, wherein the default surface texture comprises isohypses, colouring, and/or shading according to an elevation value provided by the geometry data, the default surface texture being computed by a graphics processing unit.

8. The method according to claim 1, wherein the geometry data is stored in the cache memory according to the least recently used cache algorithm.

9. The method according to claim 1, wherein the geometry data is stored in the cache memory in indexed portions, independent of a structure of the texture data.

10. The method according to claim 1, wherein providing geometry data further comprises merging geometry data with user-defined geometry data, wherein selecting data files is based on the merged geometry data.

11. The method according to claim 1, wherein the method further comprises:
dynamically computing at least one set of altered elevation data from the provided elevation data, each set of altered elevation data having a different detail level, wherein different detail levels of the altered elevation data are based on detail levels of the texture data, wherein selecting data files with texture data for requesting from the server is based on a set of altered elevation data.

12. A mobile client device adapted for requesting a set of data files from a server computer, the mobile client device comprising a display, a data storage hardware, a cache memory, and a processor, and the set of data files comprising texture data being associated with a portion of a three-dimensional surface in an image scene, the three-dimensional surface representing a terrain, wherein the image scene is defined by an observation point and a direction and/or angle of view, the set of data files is a subset of data files being stored on the server computer, and each data file comprises texture data in one of a plurality of different detail levels, the display is adapted for displaying the image scene, the data storage hardware having geometry data comprising elevation data of the three-dimensional surface, and being adapted for providing geometry data that is associated with the portion of the three-dimensional surface in the image scene to the cache memory, the processor is adapted for selecting, based on the geometry data and on visibility conditions of the texture, data files with texture data for being provided by the server computer, and the processor is adapted for requesting the provision of the selected data files from the server computer.

13. The mobile client device according to claim 12, wherein the cache memory is adapted to store the geometry data according to a recently used cache algorithm.

14. The mobile client device according to claim 12, wherein the processor comprises a graphics processing unit, wherein selecting data files and/or computing default surface texture comprising isohypses, colouring and/or shading according to an elevation value provided by the geometry data is performed by the graphics processing unit.

15. The mobile client device according to claim 12, wherein the processor is adapted for computing and rendering default surface texture, until the texture data is provided and displayable, wherein the default surface texture is based on the geometry data, wherein the default surface texture comprises isohypses, colouring and/or shading according to an elevation value provided by the geometry data.

16. The mobile client device according to claim 12, wherein the processor is adapted for merging provided geometry data with user-defined geometry data, and the processor is also adapted for selecting data files with texture data for being provided by the server computer based on merged geometry data.

17. The mobile client device according to claim 12, wherein the geometry data comprises elevation data of the three-dimensional surface and the processor is adapted for dynamically computing at least one set of altered elevation data from the provided elevation data, each set of altered elevation data having a different detail level, wherein different detail levels of the altered elevation data are based on detail levels of the texture data, wherein the processor is adapted for selecting data files with texture data for requesting from the server computer based on a set of altered elevation data.

18. A non-transitory computer program product, comprising program code which is stored on a machine-readable medium comprising a program code segment, and having computer-executable instructions for performing the following:

providing geometry data that is associated with a three-dimensional surface in an image scene from a data storage hardware of a mobile client device to a cache memory of the mobile client device, wherein the geometry data comprises elevation data of the three-dimensional surface and the three-dimensional surface represents a terrain;

selecting a set of data files with texture data for being provided by a server computer, wherein selecting data files is performed by a processor of the mobile client device based on the geometry data and on visibility conditions of the three-dimensional surface in the image scene; and requesting the provision of the selected data files from the server computer to the client device, wherein:

the image scene is defined by an observation point and a direction and/or angle of view, the set of data files is a subset of data files being stored on the server computer, and each data file comprises texture data in one of a plurality of different detail levels.

* * * * *